United States Patent
Isogawa et al.

(10) Patent No.: US 11,810,306 B2
(45) Date of Patent: Nov. 7, 2023

(54) MOTION CLASSIFICATION MODEL LEARNING APPARATUS, MOTION CLASSIFICATION APPARATUS, MOTION CLASSIFICATION MODEL LEARNING METHOD AND PROGRAM

(71) Applicant: NIPPON TELEGRAPH AND TELEPHONE CORPORATION, Tokyo (JP)

(72) Inventors: Mariko Isogawa, Kanagawa (JP); Dan Mikami, Kanagawa (JP); Kosuke Takahashi, Kanagawa (JP); Hideaki Kimata, Kanagawa (JP); Ayumi Matsumoto, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 259 days.

(21) Appl. No.: 17/059,121

(22) PCT Filed: Apr. 23, 2019

(86) PCT No.: PCT/JP2019/017217
§ 371 (c)(1),
(2) Date: Nov. 25, 2020

(87) PCT Pub. No.: WO2019/230264
PCT Pub. Date: Dec. 5, 2019

(65) Prior Publication Data
US 2021/0225007 A1 Jul. 22, 2021

(30) Foreign Application Priority Data
May 31, 2018 (JP) .................................. 2018-104669

(51) Int. Cl.
*G06T 7/20* (2017.01)
*G06N 3/08* (2023.01)
(Continued)

(52) U.S. Cl.
CPC ................. *G06T 7/20* (2013.01); *G06N 3/08* (2013.01); *G06V 10/764* (2022.01);
(Continued)

(58) Field of Classification Search
None
See application file for complete search history.

(56) References Cited

U.S. PATENT DOCUMENTS 10,783,622 B2 * 9/2020 Wang ..................... G06N 3/088

FOREIGN PATENT DOCUMENTS

KR 10-1441107 B 9/2014
KR 10-1441107 B 7/2019

OTHER PUBLICATIONS

Bobick et al. (2001) "The recognition of human movement using temporal templates", IEEE Transactions on Pattern Analysis and Machine Intelligence, 23(3):257-267.

* cited by examiner

*Primary Examiner* — Leon Flores

(57) ABSTRACT

A motion classification model learning apparatus that learns a model for early recognizing a motion is provided. A training data acquisition part acquiring training data configured with pairs of video information about a motion that can be classified into any of a plurality of categories according to characteristics of the motion and category information that is a correct label corresponding to the video information; a motion history image generation part generation a motion history image of the video information; and a model learning part learning a model that outputs a label that is the (Continued)

category information, with the motion history image as an input are included.

10 Claims, 6 Drawing Sheets

(51) Int. Cl.
*G06V 10/764* (2022.01)
*G06V 10/774* (2022.01)
*G06V 10/82* (2022.01)
*G06V 20/40* (2022.01)
*G06V 40/20* (2022.01)

(52) U.S. Cl.
CPC ............ *G06V 10/774* (2022.01); *G06V 10/82* (2022.01); *G06V 20/46* (2022.01); *G06V 40/23* (2022.01); *G06T 2207/10016* (2013.01); *G06T 2207/20081* (2013.01)

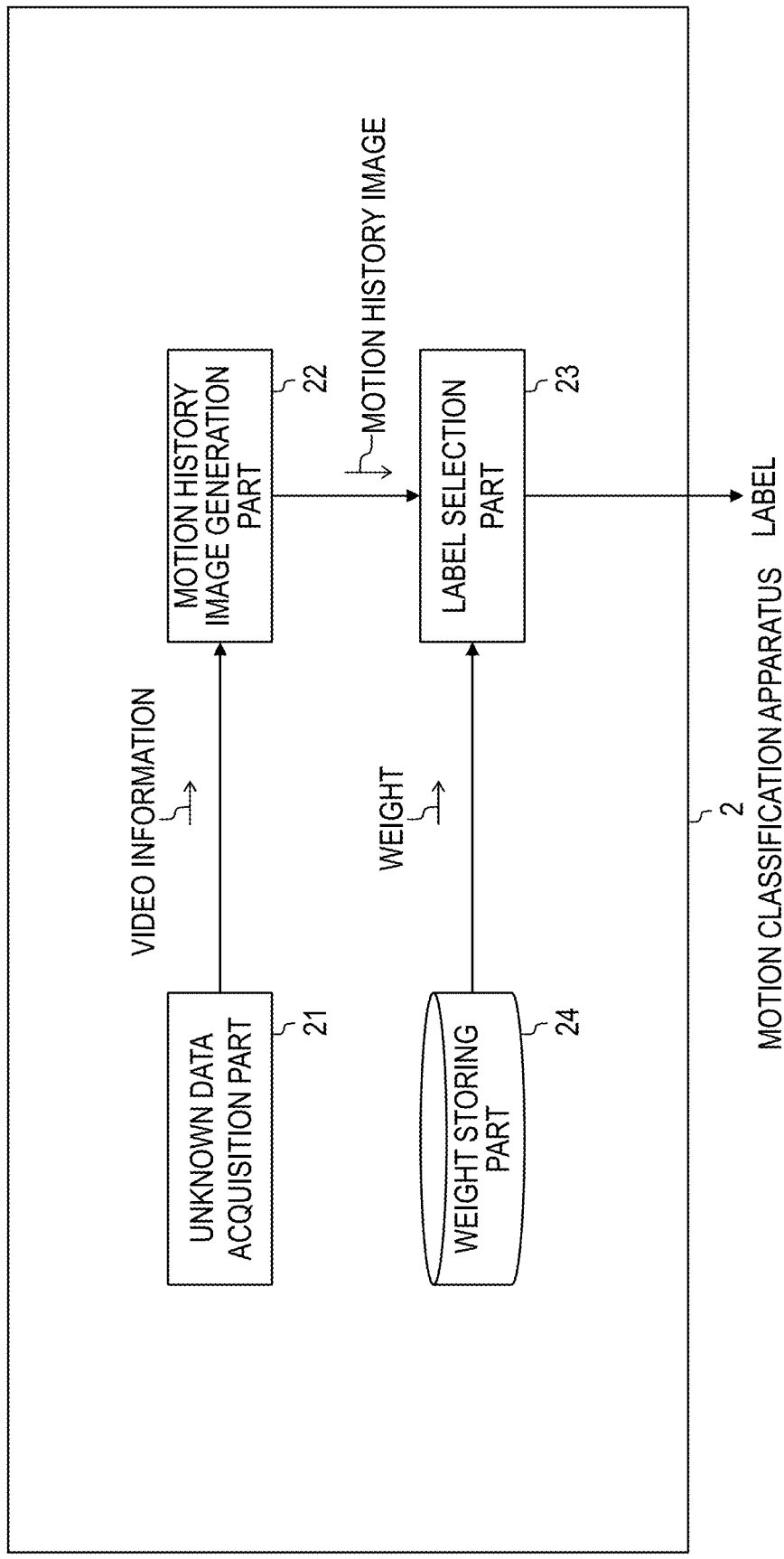

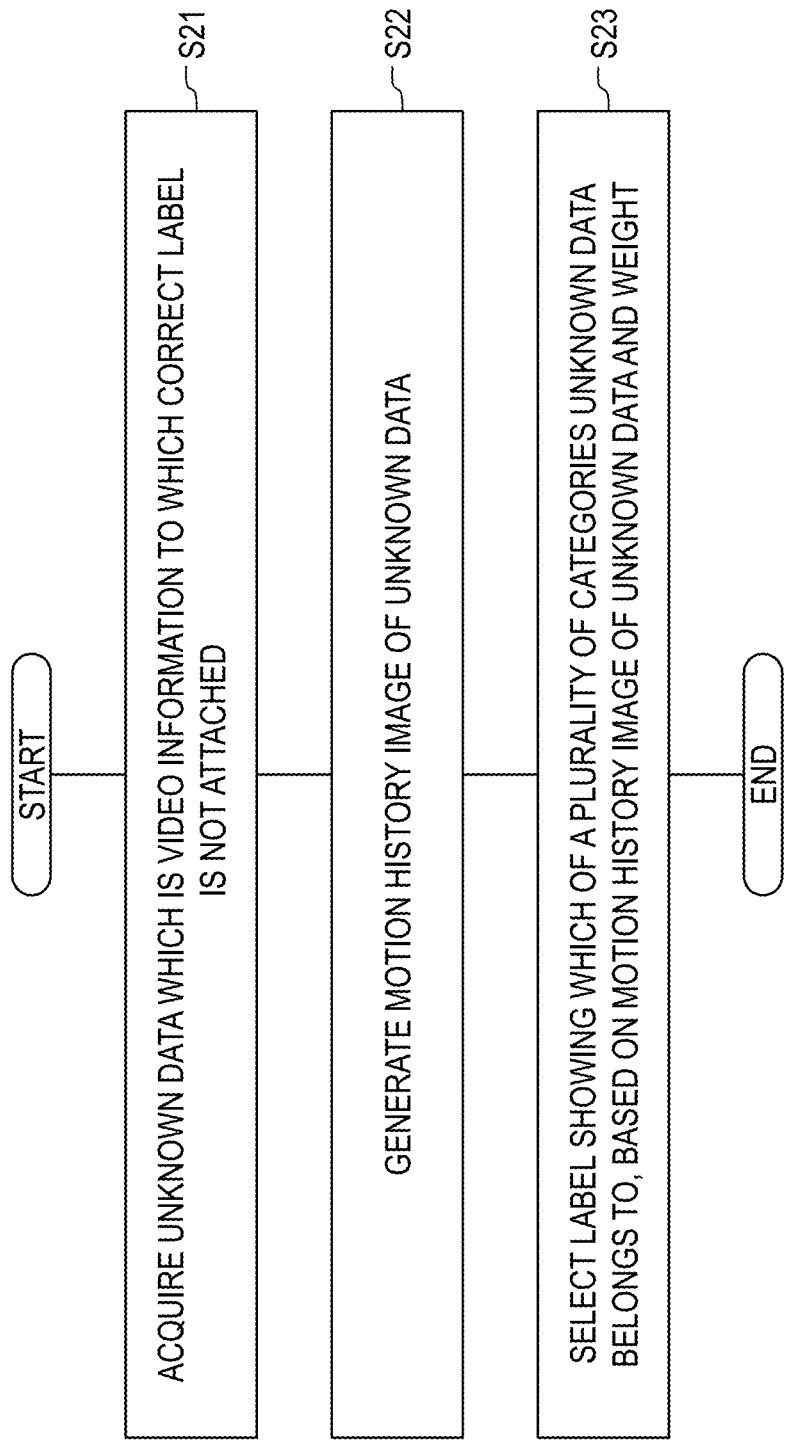

MOTION CLASSIFICATION MODEL LEARNING APPARATUS, MOTION CLASSIFICATION APPARATUS, MOTION CLASSIFICATION MODEL LEARNING METHOD AND PROGRAM

CROSS-REFERENCE TO RELATED APPLICATIONS

This application is a U.S. 371 Application of International Patent Application No. PCT/JP2019/017217, filed on 23 Apr. 2019, which application claims priority to and the benefit of JP Application No. 2018-104669, filed on 31 May 2018, the disclosures of which are hereby incorporated herein by reference in their entireties.

TECHNICAL FIELD

The present invention relates to a motion classification model learning apparatus, a motion classification apparatus, a motion classification model learning method and a program.

BACKGROUND ART

A motion history image is an image in which a locus of a motion is expressed like an afterimage by the one image such that brightness of information at a time closer to the present is higher, and brightness of information at a time farther from the present is lower. Hereinafter, the motion history image is also referred to as an MHI. By using the MHI, it is possible to perform effective learning, focusing on motion information, with a smaller amount of information than in the case of inputting video. The MHI is disclosed, for example, in Non-patent literature 1. FIG. 1 shows an example of the MHI.

PRIOR ART LITERATURE

Non-Patent Literature

Non-patent literature 1: A. F. Bobick and J. W. Davis. The recognition of human movement using temporal templates. IEEE Transactions on Pattern Analysis and Machine Intelligence, 23(3):257-267, 2001.

SUMMARY OF THE INVENTION

Problems to be Solved by the Invention

If it is possible to categorize a motion using the MHI described above, it is applicable to various fields. For example, for a baseball batter, it is important to quickly judge a pitch type from a pitching form of a pitcher. The more quickly the batter judges the pitch type, the more time he can take to react to the pitch type. Further, it is also important to judge a degree of strain on the pitcher's shoulder and body from a pitching form of the pitcher. Categorization of a motion is important not only for baseball but also for all sports competitions in which a player reacts to a motion of a counterpart player. For example, in soccer, it is important to judge where in a goal a shot of a kicker comes when seen from a goalkeeper, from a kicking form of the kicker.

Categorization of a motion is important not only for sports but also for other fields. For example, it is important to judge a risk of an injury or an accident from a motion of a person engaged in some work. A motion targeted by the judgment is not limited to a motion of a person but may be, for example, a motion of a heavy machine or a machine manipulated by a person.

To recognize a category to which a motion belongs according to characteristics of the motion before the motion ends is called early recognition in this specification. Though there is a possibility that the MHI technology described above can be applied to early recognition, a specific method therefor has not been clarified.

Therefore, an object of the present invention is to provide a motion classification model learning apparatus that learns a model for early recognizing a motion, a motion classification apparatus, a motion classification model learning method and a program.

Means to Solve the Problems

A motion classification model learning apparatus of the present invention includes a training data acquisition part, a motion history image generation part and a model learning part.

A training data acquisition part acquires training data configured with pairs of video information about a motion that can be classified into any of a plurality of categories according to characteristics of the motion and category information that is a correct label corresponding to the video information. A motion history image generation part generates a motion history image of the video information. A model learning part learns a model that outputs a label that is the category information, with the motion history image as an input.

Effects of the Invention

According to a motion classification model learning apparatus of the present invention, it is possible to learn a model for early recognizing a motion.

BRIEF DESCRIPTION OF THE DRAWINGS

FIG. 4 is a block diagram showing a configuration of a motion classification apparatus of a second embodiment;

FIG. 5 is a flowchart showing an operation of the motion classification apparatus of the second embodiment.

DETAILED DESCRIPTION OF THE EMBODIMENTS

Figure 1:
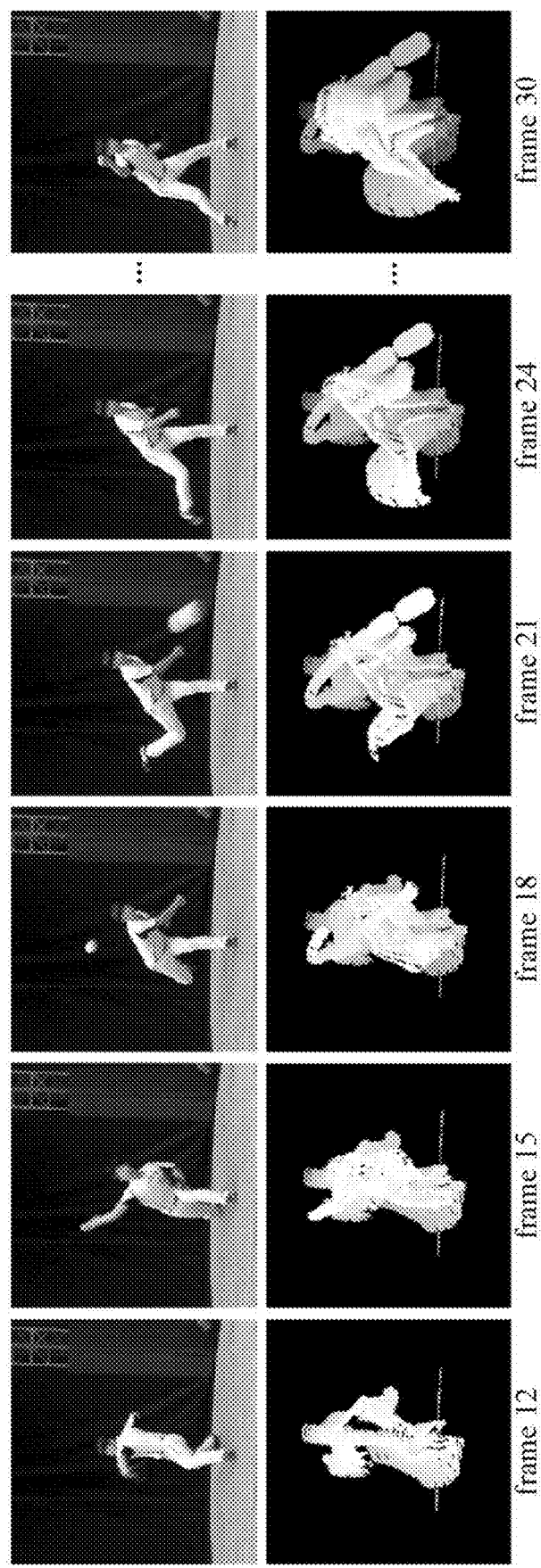
FIG. 1 is a diagram showing examples of an MHI.

Embodiments of the present invention will be described in detail below. Component parts having the same function will be given the same reference numeral, and duplicated description will be omitted.

First Embodiment

\<Motion Classification Model Learning Apparatus 1\>

Figure 2:
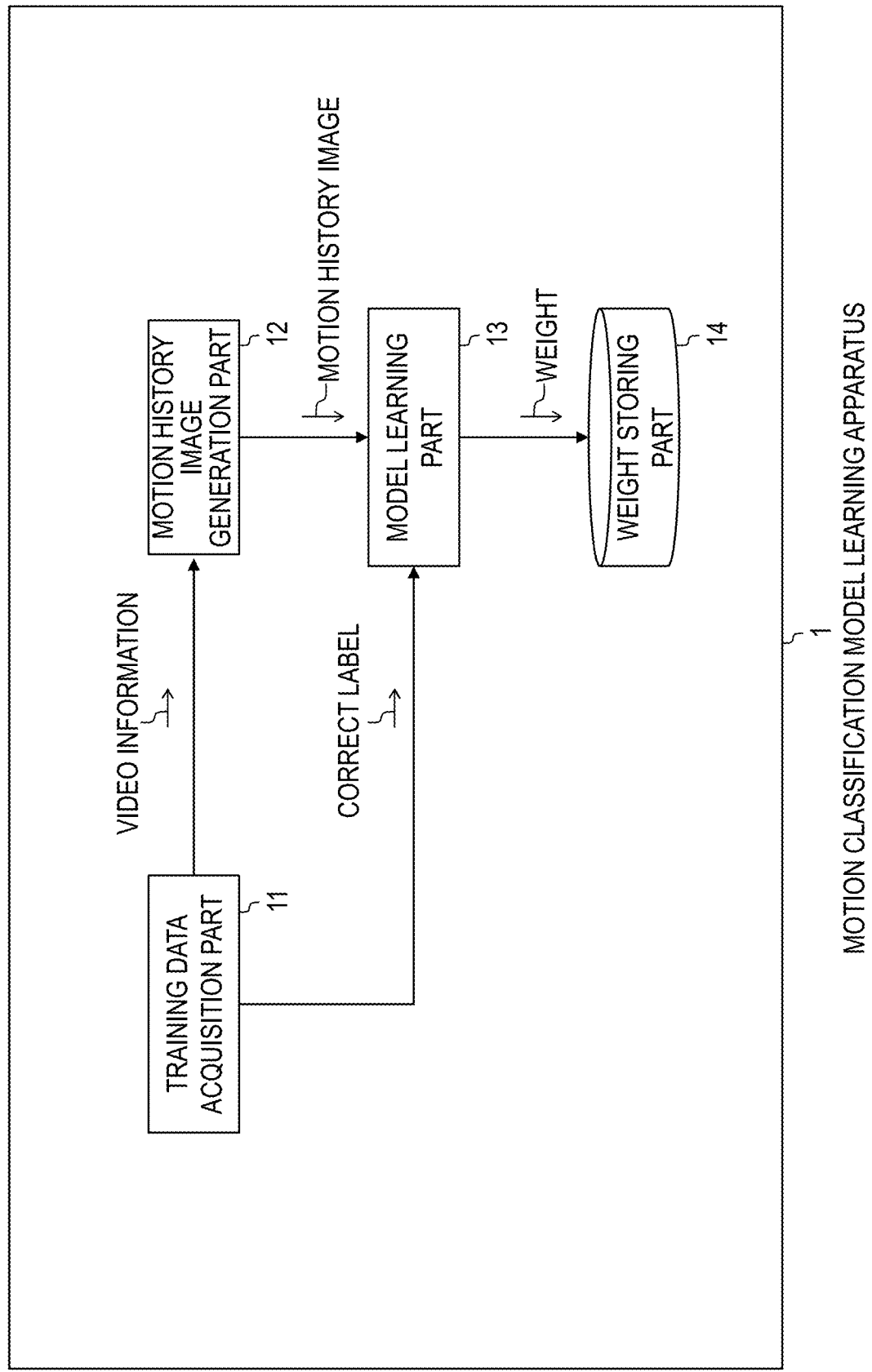
FIG. 2 is a block diagram showing a configuration of a motion classification model learning apparatus of a first embodiment.
Figure 3:
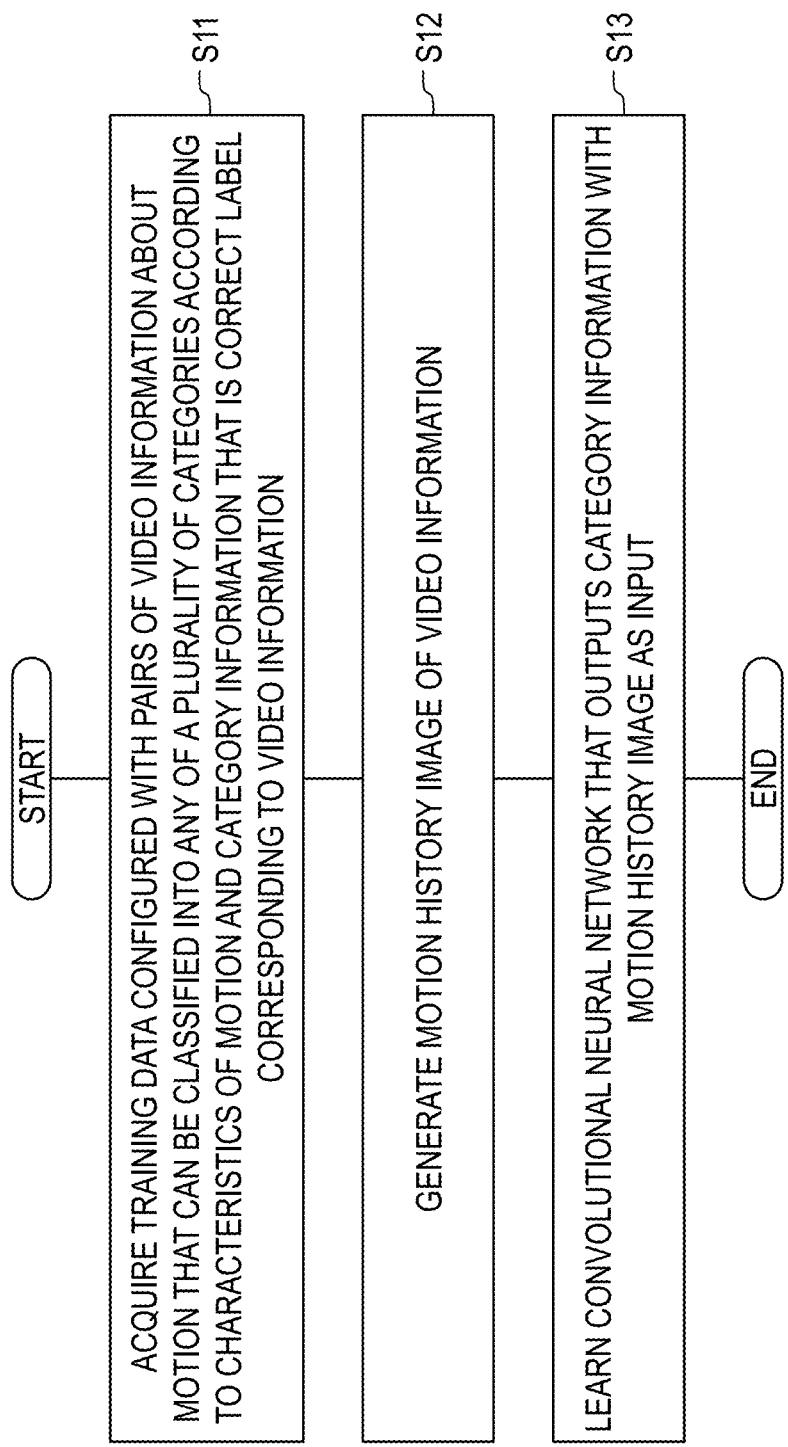
FIG. 3 is a flowchart showing an operation of the motion classification model learning apparatus of the first embodiment.

A configuration of a motion classification model learning apparatus of a first embodiment will be described below with reference to FIG. 2. As shown in FIG. 2, a motion classification model learning apparatus 1 of the present embodiment includes a training data acquisition part 11, a motion history image generation part 12, a model learning part 13 and a weight storing part 14. An operation of each part will be described below with reference to FIG. 3. For each operation, a general operation is described first, and, after that, a specific operation in a case where a pitching form of a baseball pitcher is targeted will be described in detail.

\<Training Data Acquisition Part 11\>

With training data configured with pairs of video information about a motion that can be classified into any of a plurality of categories according to characteristics of the motion and category information that is a correct label corresponding to the video information as an input, the training data acquisition part 11 outputs the video information and the correct label to the motion history image generation part 12 and the model learning part 13, respectively (S11). If step S11 is illustrated with the example of the baseball pitcher, the training data acquisition part 11 outputs, with training data configured with pairs of video information obtained by photographing pitching of the baseball pitcher (hereinafter pitching video) and category information that is a correct label corresponding to this pitching video (hereinafter pitch type information) or a label value indicating the pitch type information as an input, the pitching video, and the pitch type information or the label value indicating the pitch type information to the motion history image generation part 12 and the model learning part 13, respectively.

The pitching video of the pitcher is indicated by V, and the label value of the pitch type information is indicated by L. Furthermore, the pitching video is also indicated by V (x, y, t) where x and y are two-dimensional coordinates of frames, and t indicates a time series axis. Hereinafter, t is a variable reflecting time series information and is assumed to indicate a suffix of the time series axis of video frames. In other words, t is assumed to be a value indicating the number of frames that have elapsed from a sequence start frame. The label value L of the pitch type information is indicated by an integer determined in advance. The training data acquisition part 11 may accept text information indicating the pitch type information as an input and convert the text information to the predetermined label value L or may accept the label value L itself as an input. As for the label value L, for example, L=0 and L=1 can be assigned to a straight ball and a curveball, respectively. Though the present invention is not especially limit events in a sequence that the pitching video V (x, y, t) should include, for example, a process until a catcher catches a ball after the pitcher finishes a previous pitch and then receives the ball from the catcher can be set as one sequence that the pitching video V (x, y, t) should include.

\<Motion History Image Generation Part 12\>

With the video information outputted from the training data acquisition part 11 as an input, the motion history image generation part 12 generates an MHI of the video information and outputs the generated MHI to the model learning part 13 (S12). If step S12 is illustrated with the example of the baseball pitcher, the motion history image generation part 12 generates an MHI from the pitching video and outputs the generated MHI to the model learning part 13.

The motion history image generation part 12 outputs $M_{t'}$, which is an MHI having information corresponding to frame sections before a predetermined frame before a frame t' decided in advance based on the pitching video V (x, y, t). This can be calculated by the following formula:

$$M_{t'}(x,y) = MHI(x,y,t')$$

Here, $M_{t'}$ (x, y) indicates a brightness value of an MHI image in the frame t' at a pixel position (x, y) in the image. Note that the MHI can be calculated by the following formula:

[Formula 1]

$$MHI(x, y, t) = \begin{cases} 255, & m(x, y) = th \\ MHI(x, y, t-1) - d, & \text{otherwise} \end{cases} \quad (1)$$

Here, m (x, y) can be determined by an inter-frame difference V (x, y, t)–V (x, y, t–1) between frames t and t–1. Here, th is a scalar value from 0 to 255 that indicates a threshold for the difference, which decides how large motion is to be included in the MHI, and, for example, th=1 can be set. Further, d is a parameter that decides how old frames should be frames the information of which is to be propagated to the MHI, and has an integer value that is 1 or greater and less than the number of frames included in the sequence. For example, when d=8 is set, brightness decreases by 8 per frame, and information of old frames included in the MHI corresponds to 256/8=32 frames. When d=16 is set, the brightness decreases by 16 per frame, and the information of the old frames included in the MHI corresponds to 256/16=16 frames.

\<Model Learning Part 13\>

The model learning part 13 learns a convolutional neural network (hereinafter also referred to as a CNN) that outputs a label that is category information, with an MHI as an input, and outputs a weight W of the learned CNN (S13). If step S13 is illustrated with the example of the baseball pitcher, the model learning part 13 learns the CNN, with the training data (the pairs of an MHI based on pitching video and pitch type information) as an input. This CNN is a neural network model (a discriminator) that outputs pitch type information, with an MHI based on pitching video as an input.

Based on $M_{t'}$ determined at step S12 and the label value L of the pitch type information acquired at step S11, the model learning part 13 learns a CNN that outputs L with $M_{t'}$ as an input, and outputs the weight W of the learned CNN. Here, a structure of the CNN may be any structure that solves a classification problem. Though the present invention does not especially restrict the network structure, for example, VGG16 proposed in Reference non-patent literature 1 can be used.

(Reference non-patent literature 1: K. Simonyan and A. Zisserman Very Deep Convolutional Networks for Large-Scale Image Recognition. CoRR, abs/1409.1, 2014.)

\<Weight Storing Part 14\>

The weight storing part 14 stores the weight (a weight parameter) of the learned CNN. In the case of the example of the baseball pitcher, the weight of the CNN that outputs pitch type information with an MHI based on pitching video as input is stored. The weight of the learned CNN is transmitted to a motion classification apparatus 2 described later.

Note that the motion classification model learning apparatus 1 and the motion classification apparatus 2 described later may be integrated as one piece of hardware. In this case, the weight storing part 14 may also serve as a weight storing part 24 described later.

Though the invention described in the above first embodiment uses a CNN as a learner and an estimator as an example, an application range of the present invention is not limited to a CNN but may be applied to a network such as an RNN and an LSTM. Further, the present invention does not especially restrict a network layer depth, either. However, since the learned weight W is used, the network is required to be a network with two or more layers.

Second Embodiment

«Motion Classification Apparatus 2»

A configuration of a motion classification apparatus of a second embodiment will be described below with reference to FIG. 4. As shown in FIG. 4, the motion classification apparatus 2 of the present embodiment includes an unknown data acquisition part 21, a motion history image generation part 22, a label selection part 23 and a weight storing part 24. An operation of each part will be described below with reference to FIG. 5. For each operation, a general operation is described first, and, after that, a specific operation in the case where a pitching form of a baseball pitcher is targeted will be described in detail.

<Weight Storing Part 24>

In the weight storing part 24, a weight (a weight parameter) of a convolutional neural network learned in the motion classification model learning apparatus 1 and transmitted to the motion classification apparatus 2 is stored.

<Unknown Data Acquisition Part 21>

Unknown data, which is video information to which a correct label is not attached, is inputted to the unknown data acquisition part 21, and the unknown data acquisition part 21 outputs the inputted unknown data to the motion history image generation part 22 (S21). If step S21 is illustrated with the example of the baseball pitcher, the pitching video V to which pitch type information is not attached as a correct label, is inputted to the unknown data acquisition part 21, and the unknown data acquisition part 21 outputs the inputted pitching video V to the motion history image generation part 22. Similarly to the above description, x and y are two-dimensional coordinates of frames, t indicates a time series axis, and the pitching video is indicated by V (x, y, t).

<Motion History Image Generation Part 22>

With the unknown data, which is the video information, outputted from the unknown data acquisition part 21 as an input, the motion history image generation part 22 generates an MHI of the unknown data and outputs the generated MHI (S22). If step S22 is illustrated with the example of the baseball pitcher, the motion history image generation part 22 generates, with the pitching video V, to which pitch type information is not attached as a correct label, as an input, an MHI of the pitching video V and outputs the generated MHI. The operation of the motion history image generation part 22 is the same as the operation of the motion history image generation part 12.

<Label Selection Part 23>

With the MHI of the unknown data outputted from the motion history image generation part 22 and the weight of the learned CNN stored in the weight storing part 24 as an input, the label selection part 23 executes a CNN calculation process based on the MHI of the unknown data and the weight of the CNN, selects a label showing which of the plurality of categories the unknown data belongs to and outputs the label (S23). If step S23 is illustrated with the example of the baseball pitcher, the MHI based on the pitching video, which has been generated at step S22, is inputted to a CNN (a discriminator) specified by the weight parameter stored in the weight storing part 24, and a label identifying a pitch type is selected based on outputted pitch type information, and the label is outputted.

With the network weight W acquired from the weight storing part 24 and the MHI ($M_{t'}$) as an input, the label selection part 23 selects a label of pitch type information from an output L' of the CNN at the time of $M_{t'}$ being inputted, by a CNN identified by the weight W (that is, the same CNN as the CNN learned at step S13). According to the final output L' of the CNN, the label can be selected as follows.

(a) A Case where the Final Output of the CNN is: The Scalar Value L'=b

A label to be selected is an integer that is the closest to the scalar value b. For example, a case where, for a task of performing binary classification between straight ball and curveball, labels that can be selected are indicated by two values such as 0 (straight) and 1 (curve) applies. In this case, the final output L' from the CNN is obtained as a decimal from 0 to 1, and the closest integer is the label to be selected. For example, if the final output L' is 0.3, the label 0 (straight) is selected. If the final output L' is 0.8, the label 1 (curve) is selected. Though the classification may be performed, with the threshold set as 0.5 as described above, adjustment may be performed so that a curveball or a straight ball is easily judged, by biasing the threshold in consideration of tendencies of the pitcher and judgment results. The classification is not limited to the above binary classification but may be classification into three or more types. In that case, for example, an integer multi-value label, such as 0: straight ball, 1: curveball, and 2: fork ball, is set; and an integer label value that is the closest to the final output value from the network can be set as an estimated label. For example, if the final output is 0.3, the label 0 (straight) can be selected. If the final output L' is 1.8, the label 2 (fork ball) can be selected.

(b) A Case where the Final Output of the CNN is a Vector Expression a(N) Including Numerical Values Corresponding to a Plurality of Labels (N Labels), Respectively For example, a case where, for a task of performing multi-value classification using 0: straight ball, 1: curveball, 2: fork ball and the like, the final output of the CNN is indicated by probabilities corresponding to the number of labels (for example, a vector v configured with three arrays) corresponds to this case. In this case, an output of each array is obtained as a decimal from 0 to 1, and a label corresponding to an array the numerical value of which is the largest is the label to be selected. For example, in the case of (v[0], v[1], v[2])=(0.3, 0.2, 0.5), "2: fork ball" is the label to be selected. In the case of (v[0], v[1], v[2])=(0.5, 0.2, 0.3), "0: straight ball" is the label to be selected.

[Modification 1]

Figure 6A:
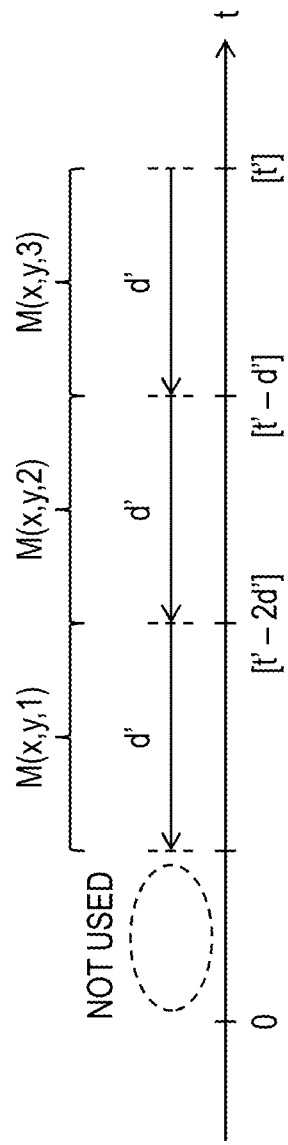
FIG. 6A and FIG. 6B are diagrams illustrating an example examples of generation of MHIs in the case of using a plurality of MHIs.
Figure 6B:
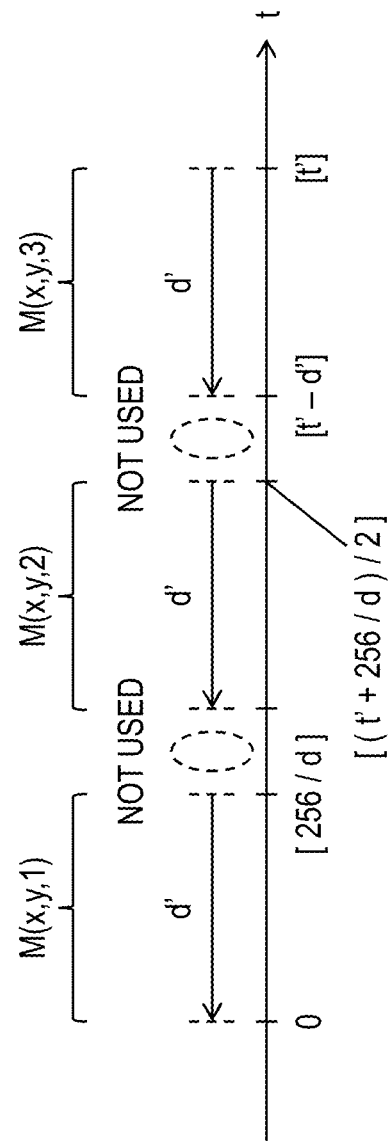

A modification of the motion classification model learning apparatus 1 of the first embodiment and the motion classification apparatus 2 of the second embodiment will be described below with reference to FIG. 6A and FIG. 6B. Horizontal axes in FIG. 6A and FIG. 6B indicate a time t, and [t'] means a time when a frame t' ends. Each sequence in FIG. 6A and FIG. 6B has t' frames in total, and the newest frame is the frame t'. In FIG. 6A and FIG. 6B, it is assumed that one sequence corresponds to a period from a time 0 to the time [t']. The time 0 in FIG. 6A and FIG. 6B is a sequence start time, and the time [t'] in FIG. 6A and FIG. 6B is a sequence end time. In the present modification, a motion history image generation part that generates an MHI from video information generates a plurality of MHIs corresponding to different time sections (frame sections) and outputs what is obtained by combining the MHIs.

In the present modification, a motion history image generation part of a motion classification model learning apparatus generates a plurality of MHIs that do not overlap in a time direction, and a model learning part of the apparatus learns a convolutional neural network that outputs category information, with the plurality of MHIs as an input.

Further, in the present modification, a convolutional neural network used by a motion classification apparatus is learned with a plurality of MHIs that do not overlap in the time direction as an input and with category information as an output, and a motion history image generation part of the apparatus generates the plurality of MHIs that do not overlap with one another in the time direction. Of course, it is necessary to use the same MHI generation method on the CNN learning side and on the motion classification side.

One MHI does not hold old information before a predetermined time (before 255/d frames or more) as seen from the formula for the MHI. Therefore, by using MHIs at different times, it is possible to hold motion information in a broader time series and cause the motion information to be an input to the CNN.

Though the present invention does not especially restrict a method for combining MHIs of a plurality of time series, for example, each channel of a three-channel image M, may store an M calculated based on a different time, as shown below.

Example 1; See FIG. 6A

A plurality of MHIs generated so that the MHIs are sequential in the time direction without gaps at d' frame intervals, and the sequence end time [t'] is included in the last MHI are stored in the channels, respectively, for example, as below.

$M(x,y,1) = M_{(t'-2*d')}$ $M(x,y,2) = M_{(t'-d')}$ $M(x,y,3) = M_{t'}$

Thereby, it is also possible to hold information about two MHIs based on two times [t'−d'] and [t'−2*d'] before a certain frame t'. Further, by adjusting d, it is possible to adjust how much the time of information that is to be held is away from [t'].

Example 2, See FIG. 6B

A plurality of MHIs generated being dispersed at intervals in the time direction so that the sequence start time 0 is included in the first MHI at d' frame intervals, and the sequence end time [t'] is included in the last MHI are stored in the channels, for example, as below.

$M(x,y,1) = M_{(256/d)}$ $M(x,y,2) = M_{((t'+256/d)/2)}$ $M(x,y,3) = M_{t'}$

Here, 256/d is an index of an MHI at the earliest time that can be generated using a parameter d that controls the number of frames one MHI holds in Formula (1). Note that, if d'=t'/3 is satisfied in Example 1, Examples 1 and 2 are equivalent. In Example 2, generation of MHIs is not limited to equal division. For example, MHIs may be generated so that MHIs are denser or sparser as time is closer to the current time.

Effects expected by each of Examples 1 and 2 will be described below. In Example 1, it is possible to predominantly have not information immediately after the sequence but information at a time close to the frame t'. Therefore, it is thought that Example 1 is more effective when the information immediately after start of the sequence is not so meaningful. On the other hand, in Example 2, since it is possible to comprehensively have information from a first time to a second time, the first and second times being determined in advance, specifically, information corresponding to frame sections from the sequence start time 0 to the sequence end time [t'], it is thought that Example 2 is effective for such an event that not only the latest time but also the whole sequence should be considered.

<Supplementary Note 1>

As stated in [PROBLEMS TO BE SOLVED BY THE INVENTION], the present invention can be used to categorize a motion of a player in sports such as baseball and soccer and can be used to categorize a motion of a person engaged in some work other than sports. The present invention can also be used to categorize not only a motion of a person but also, for example, a motion of a heavy machine or a machine manipulated by a person. The present invention is applicable to any motion if the motion can be classified in any of a plurality of categories according to characteristics of the motion.

<Supplementary Note 2>

For example, as a single hardware entity, an apparatus of the present invention has an inputting part to which a keyboard and the like can be connected, an outputting part to which a liquid crystal display and the like can be connected, a communicating part to which a communication device (for example, a communication cable) communicable to the outside of the hardware entity can be connected, a CPU (Central Processing Unit, which may be provided with a cache memory, a register and the like), a RAM and a ROM that are memories, an external storage device that is a hard disk, and a bus connecting the inputting part, the outputting part, the communicating part, the CPU, the RAM, the ROM and the external storage device to enable data exchange among them. Further, the hardware entity may be provided with a device (a drive) or the like capable of reading from/writing to a recording medium such as a CD-ROM. As a physical entity provided with such hardware resources, a general-purpose computer or the like can be given.

In the external storage device of the hardware entity, programs required to realize the functions described above and data and the like required for processing of the programs are stored. (The storage is not limited to an external storage device. For example, the programs may be stored in the ROM that is a read-only storage device). Data and the like obtained by processing of the programs are appropriately stored in the RAM, the external storage device or the like.

In the hardware entity, each program stored in the external storage device (or the ROM or the like) and data required for processing of the program are read into the memory as necessary, and interpretation, execution and processing are appropriately performed by the CPU. As a result, the CPU realizes predetermined functions (the components represented as . . . part, . . . means or the like above).

The present invention is not limited to the above embodiments but can be appropriately changed within a range not departing from the spirit of the present invention. Further, the processes described in the above embodiments are not only executed in time series in order of the description but also may be executed in parallel or individually according to the processing capability of the apparatus that executes the processes or as necessary.

In the case of realizing the processing functions of the hardware entity (the apparatus of the present invention) described in the above embodiments by a computer as already stated, processing content of the functions that the hardware entity should have is written by a program. Then, by executing the program on the computer, the processing functions of the hardware entity are realized on the computer.

The program in which the processing content is written can be recorded in a computer-readable recording medium. As the computer-readable recording medium, anything, for example, a magnetic recording device, an optical disk, a magneto-optical recording medium or a semiconductor memory is possible. Specifically, for example, a hard disk device, a flexible disk, a magnetic tape or the like can be used as the magnetic recording device; a DVD (Digital Versatile Disc), a DVD-RAM (Random Access Memory), a CD-ROM (Compact Disc Read Only Memory), a CD-R (Recordable)/RW (ReWritable) or the like can be used as the optical disk; an MO (Magneto-Optical disc) or the like can be used as the magneto-optical recording medium; and an EEP-ROM (Electronically Erasable and Programmable-Read Only Memory) or the like can be used as the semiconductor memory.

Distribution of the program is performed, for example, by performing sales, transfer, lending or the like of a portable recording medium, such as a DVD and a CD-ROM, in which the program is recorded. Furthermore, a configuration is also possible in which the program is distributed by storing the program in a storage device of a server computer and transferring the program from the server computer to other computers via a network.

For example, a computer that executes such a program first stores the program recorded in the portable recording medium or transferred from the server computer into its own storage device once. Then, at the time of executing processing, the computer reads the program stored in its own storage medium and executes the processing according to the read program. Further, as another execution form of the program, a computer may read the program directly from the portable recording medium and execute processing according to the program. Furthermore, each time a program is transferred to the computer from the server computer, the computer may sequentially execute processing according to the received program. Further, a configuration is also possible in which the above processing is executed by a so-called ASP (Application Service Provider) type service in which, without transferring the program from the server computer to the computer, the processing functions are realized only by an instruction to execute the program and acquisition of a result. Note that it is assumed that the program in this form includes information provided for processing by an electronic calculator, which is equivalent to a program (the information not being a direct command to the computer but data or the like having a nature of specifying processing of the computer).

Further, though it is assumed in this form that the hardware entity is configured by causing a predetermined program to be executed on a computer, at least a part of the processing content may be realized as hardware.

What is claimed is:

1. A motion classification model learning apparatus comprising:
a training data acquisition part acquiring training data configured with pairs of video information about a motion that can be classified into any of a plurality of categories according to characteristics of the motion and category information that is a correct label corresponding to the video information,
wherein the motion is associated with:
a player playing a sport,
a worker engaged in a work, or
a machine manipulated by a person,
wherein, when the motion is associated with the player playing the sport, at least one category of the plurality of categories comprises:
the sport including the motion, or
the motion associated with the sport,
wherein, when the motion is associated with the worker engaged in the work, at least one category of the plurality of categories comprises:
the work associated with the motion, or
a work item associated with the work, and
wherein, when the motion is associated with the machine manipulated by the person, at least one category of the plurality of categories comprises:
the machine associated with the motion, or
the motion associated with the machine performing the work;
a motion history image generation part generating a motion history image of the video information; and
a model learning part learning a model that outputs a label that is the category information, with the motion history image as an input.

2. The motion classification model learning apparatus according to claim 1, wherein
the motion history image generation part generates a plurality of the motion history images that do not overlap in a time direction; and
the model learning part learns a model that outputs the category information, with the plurality of motion history images as an input.

3. The motion classification model learning apparatus according to claim 2, wherein
the motion history image generation part generates the plurality of motion history images from a plurality of frame sections included in the video information, respectively, the plurality of frame sections being sequential in the time direction without gaps, and a latest end time among end times of the plurality of frame sections being a time determined in advance; and
the model learning part learns the model that outputs the category information, with the plurality of motion history images generated from the plurality of frame sections included in the video information as an input, the plurality of frame sections being sequential in the time direction without gaps, and the latest end time among the end times of the plurality of frame sections being the time determined in advance.

4. The motion classification model learning apparatus according to claim 2, wherein
the motion history image generation part generates the plurality of motion history images from a plurality of frame sections included in the video information, respectively, the plurality of frame sections including a frame section where an earliest start time among start times of the plurality of frame sections is a first time determined in advance, and a frame section where a latest end time among end times of the plurality of frame sections is a second time determined in advance; and the model learning part learns a model that outputs the category information, with the plurality of motion history images generated from the plurality of frame sections included in the video information, respectively, as an input, the plurality of frame sections including the frame section where the earliest start time among the start times of the plurality of frame sections is the first time determined in advance, and the frame section where the latest end time among the end times of the plurality of frame sections is the second time determined in advance.

5. A non-transitory computer-readable storage medium storing a program causing a computer to function as the apparatus according to claim 1.

6. A motion classification apparatus comprising:
a weight storing part storing a weight of a model learned based on a motion history image of video information about a motion that can be classified into any of a plurality of categories according to characteristics of the motion and a correct label corresponding to the video information,
wherein the motion is associated with:
a player playing a sport,
a worker engaged in a work, or
a machine manipulated by a person,
wherein, when the motion is associated with the player playing the sport, at least one category of the plurality of categories comprises:
the sport including the motion, or
the motion associated with the sport,
wherein, when the motion is associated with the worker engaged in the work, at least one category of the plurality of categories comprises:
the work associated with the motion, or
a work item associated with the work, and
wherein, when the motion is associated with the machine manipulated by the person, at least one category of the plurality of categories comprises:
the machine associated with the motion, or
the motion associated with the machine performing the work;
an unknown data acquisition part acquiring unknown data that is the video information to which the correct label is not attached;
a motion history image generation part generating the motion history image of the unknown data; and
a label selection part selecting a label showing which of the plurality of categories the unknown data belongs to, based on the motion history image of the unknown data and the weight.

7. The motion classification apparatus according to claim 6, wherein
the model is learned with a plurality of the motion history images that do not overlap in a time direction as an input, and with category information as an output; and
the motion history image generation part generates the plurality of motion history images that do not overlap in the time direction.

8. The motion classification apparatus according to claim 7, wherein
the model is learned with the plurality of motion history images generated so that the plurality of motion history images are sequential in the time direction without gaps, and a sequence end time determined in advance is included in a last motion history image as an input and with the category information as an output; and
the motion history image generation part generates the plurality of motion history images so that the plurality of motion history images are sequential in the time direction without gaps, and the sequence end time determined in advance is included in the last motion history image.

9. The motion classification apparatus according to claim 7, wherein
the model is learned with the plurality of motion history images dispersed in the time direction at intervals so that a sequence start time determined in advance is included in a first motion history image, and a sequence end time determined in advance is included in a last motion history image as an input and with the category information as an output, and
the motion history image generation part generates the plurality of motion history images dispersed in the time direction at the intervals so that the sequence start time determined in advance is included in the first motion history image, and the sequence end time determined in advance is included in the last motion history image.

10. A motion classification model learning method executed by a motion classification model learning apparatus, the motion classification model learning method comprising steps of:
acquiring training data configured with pairs of video information about a motion that can be classified into any of a plurality of categories according to characteristics of the motion and category information that is a correct label corresponding to the video information,
wherein the motion is associated with:
a player playing a sport,
a worker engaged in a work, or
a machine manipulated by a person,
wherein, when the motion is associated with the player playing the sport, at least one category of the plurality of categories comprises:
the sport including the motion, or
the motion associated with the sport,
wherein, when the motion is associated with the worker engaged in the work, at least one category of the plurality of categories comprises:
the work associated with the motion, or
a work item associated with the work, and
wherein, when the motion is associated with the machine manipulated by the person, at least one category of the plurality of categories comprises:
the machine associated with the motion, or
the motion associated with the machine performing the work;
generating a motion history image of the video information; and
learning a model that outputs a label that is the category information, with the motion history image as an input.

* * * * *